United States Patent
Kummetz et al.

(10) Patent No.: US 8,867,451 B2
(45) Date of Patent: Oct. 21, 2014

(54) OPTIMIZED TELECOMMUNICATIONS DISTRIBUTION SYSTEM

(71) Applicant: Andrew LLC, Hickory, NC (US)

(72) Inventors: Thomas Kummetz, Kissing (DE); Christopher G. Ranson, Concord, VA (US); Van E. Hanson, Forest, VA (US); Michael Williamson, Clayton, NC (US)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 13/757,742

(22) Filed: Feb. 2, 2013

(65) Prior Publication Data

US 2013/0201916 A1 Aug. 8, 2013

Related U.S. Application Data

(60) Provisional application No. 61/594,085, filed on Feb. 2, 2012.

(51) Int. Cl.
*H04W 4/00* (2009.01)
*H04W 24/02* (2009.01)
*H04W 88/08* (2009.01)

(52) U.S. Cl.
CPC ............ *H04W 24/02* (2013.01); *H04W 88/085* (2013.01)
USPC .......................................................... 370/328

(58) Field of Classification Search
CPC .... H04W 16/20; H04W 24/02; H04W 88/085
USPC ....................................................... 370/328
See application file for complete search history.

(56) References Cited

U.S. PATENT DOCUMENTS

| 6,549,776 B1 * | 4/2003 | Joong ........................... 455/433 |
| 7,443,805 B1 * | 10/2008 | Bynum ........................ 370/254 |
| 7,565,170 B2 | 7/2009 | Buscaglia et al. |

(Continued)

FOREIGN PATENT DOCUMENTS

| JP | 2010062856 | 3/2010 |
| WO | 2009151893 A2 | 12/2009 |

(Continued)

OTHER PUBLICATIONS

4G Americas, "Self-Optimizing Networks: The Benefits of SON in LTE," Jul. 2011 (70 pages).

(Continued)

*Primary Examiner* — Brandon Renner
*Assistant Examiner* — Faisal Choudhury
(74) *Attorney, Agent, or Firm* — Kilpatrick Townsend & Stockton LLP

(57) ABSTRACT

Systems and methods for optimized telecommunications distribution are provided. For example, a distributed antenna system can include a master unit for transceiving signals with remote units operable for wirelessly transceiving signals with mobile devices in a coverage area. A self-optimized network analyzer can be in a unit of the distributed antenna system. A self-optimized network controller in the distributed antenna system can output commands for changing operation of a component in the distributed antenna system in response to analysis results from the self-optimized network analyzer. In some aspects, the master unit includes base transceiver station cards for receiving call information in network protocol data from a network and for generating digital signals including the call information from the network protocol data for distribution to the remote units.

34 Claims, 8 Drawing Sheets

(56) References Cited

U.S. PATENT DOCUMENTS

| | | | |
|---|---|---|---|
| 8,254,848 B1* | 8/2012 | Elliott et al. | 455/67.11 |
| 8,346,091 B2* | 1/2013 | Kummetz et al. | 398/115 |
| 2009/0061940 A1* | 3/2009 | Scheinert et al. | 455/562.1 |
| 2010/0067505 A1 | 3/2010 | Fein et al. | |
| 2010/0177760 A1 | 7/2010 | Cannon et al. | |
| 2010/0189170 A1* | 7/2010 | Wiwel et al. | 375/231 |
| 2011/0105184 A1 | 5/2011 | Piirainen et al. | |
| 2011/0135308 A1* | 6/2011 | Tarlazzi et al. | 398/79 |
| 2011/0136478 A1* | 6/2011 | Trigui | 455/418 |
| 2011/0275397 A1* | 11/2011 | Guey et al. | 455/509 |

FOREIGN PATENT DOCUMENTS

| | | | |
|---|---|---|---|
| WO | 2009151893 A3 | 12/2009 | |
| WO | 2010126667 A1 | 11/2010 | |
| WO | 2011071870 A1 | 6/2011 | |
| WO | 2012054553 A1 | 4/2012 | |

OTHER PUBLICATIONS

Feng et al., "Self-Organizing Networks (SON) in 3GPP Long Term Evolution", May 20, 2008, Nomor Research GmbH, Munich, Germany (15 pages).

International Patent Application No. PCT/US2013/024532, International Search Report and Written Opinion mailed Jun. 2, 2013 (9 pages).

International Patent Application No. PCT/US2011/056809, International Search Report and Written Opinion mailed Feb. 2, 2012 (14 pages).

\* cited by examiner

OPTIMIZED TELECOMMUNICATIONS DISTRIBUTION SYSTEM

CROSS-REFERENCE TO RELATED APPLICATIONS

This application claims priority to U.S. Provisional Application Ser. No. 61/594,085 filed Feb. 2, 2012 and titled "Multi-Base Station with Configurable Distribution Using Active Antennas," the contents of which are hereby incorporated by reference.

TECHNICAL FIELD

The present invention relates generally to telecommunications and, more particularly (although not necessarily exclusively), to optimized systems for distributing telecommunications signals.

BACKGROUND

A distributed antenna system ("DAS") can be used to extend the coverage of a cellular communication system to areas of traditionally low signal coverage, such as within buildings, tunnels, or in areas obstructed by terrain features. A DAS can extend coverage by receiving signals from a base station of a cellular communication system and re-transmitting the signals directly into low-coverage areas. A DAS can include a master unit distributing signals to, and receiving signals from, remote antenna units that are physically separate from the master unit, but in communication with the master unit over a link. A remote antenna unit can wirelessly communicate signals to wireless devices positioned in a coverage area.

Optimized DAS's and/or DAS's having base transceiver station capabilities are desirable.

SUMMARY

In one aspect, a distributed antenna system is provided that includes a master unit, a self-optimized network analyzer, and a self-optimized network controller. The master unit can transceive signals with remote units that can wirelessly transceive signals with mobile devices in a coverage area. The self-optimized network analyzer is in a unit of the distributed antenna system. The self-optimized network controller can output commands for changing operation of a component in the distributed antenna system in response to analysis results from the self-optimized network analyzer.

In another aspect, a distributed antenna system is provided that includes a master unit. The master unit can communicate digitized signals with remote units operable for providing wireless network coverage in an area. The master unit includes base transceiver station cards that can receive call information in network protocol data from a network and that can generate digital signals including the call information from the network protocol data for distribution to the remote units.

In another aspect, a distributed antenna system is provided that includes a master unit, a self-optimized network analyzer, and a self-optimized network controller. The master unit can communicate digitized signals with remote units operable for providing wireless network coverage in an area. The master unit includes base transceiver station cards that can receive call information in network protocol data from a network and that can generate digital signals including the call information from the network protocol data for distribution to the remote units. The self-optimized network analyzer is in a unit of the distributed antenna system. The self-optimized network controller is in the master unit and can output commands for changing operation of a component in the distributed antenna system in response to analysis results from the self-optimized network analyzer.

The details of one or more aspects and examples are set forth in the accompanying drawings and the description below. Other features and aspects will become apparent from the description, the drawings, and the claims.

DETAILED DESCRIPTION

Certain aspects and examples of the present invention are directed to a distributed antenna system ("DAS") that is optimized. In some aspects, a DAS includes self-optimized network ("SON") capabilities, also referred to as self-organizing network capabilities or self-organized network capabilities. SON capabilities can include, among others, detecting interference in a downlink band and modifying transmission of signals in the downlink band, identifying free frequencies by analyzing frequencies used in a macro-cell environment, and storing information about frequencies using in a macro-cell environment. SON capabilities can use less centralized network planning and employ algorithms that can, for example, identify the locally used frequencies and determine the frequencies for a new base station transceiver ("BTS") from the results of the algorithms. Local or remote databases can be used to support the algorithms. The algorithms can minimize the amount of interference created and experienced by new BTS signals.

In some aspects, the DAS is a multi-base transceiver station DAS ("MB-DAS"). The MB-DAS may include the SON capabilities and/or additional SON capabilities, or no SON capabilities. The MB-DAS can include one or more BTS cards. The BTS cards can encode signals, decode signals, process signals into a proper wireless protocol, communicate signals to a BTS controller or mobile telephone switching office, and provide processed signals for digital distribution to distributed antennas in a coverage area. In some aspects, a MB-DAS can distribute signals without requiring installation or use of a conventional BTS. The BTS cards can be easily added, removed, or replaced to provide desired wireless communication protocol transmission and allow capacity to be easily configurable. An MB-DAS, according some aspects, may include additional SON capabilities, such as synchronization in frequency and in timing among BTS cards, macro-cell to DAS-cell hand-in configuration, DAS-cell to macro-cell hand-off configuration, maintenance of macro-cell and DAS-cell database information, and mapping of antenna units with macro-cell hand-off and hand-in support. Although "BTS" and "MB-DAS" are used herein, NodeB (e.g., for 3G-UMTS wireless networks) and/or eNodeB (e.g., for 4G LTE) can additionally or alternatively be used.

Figure 1:
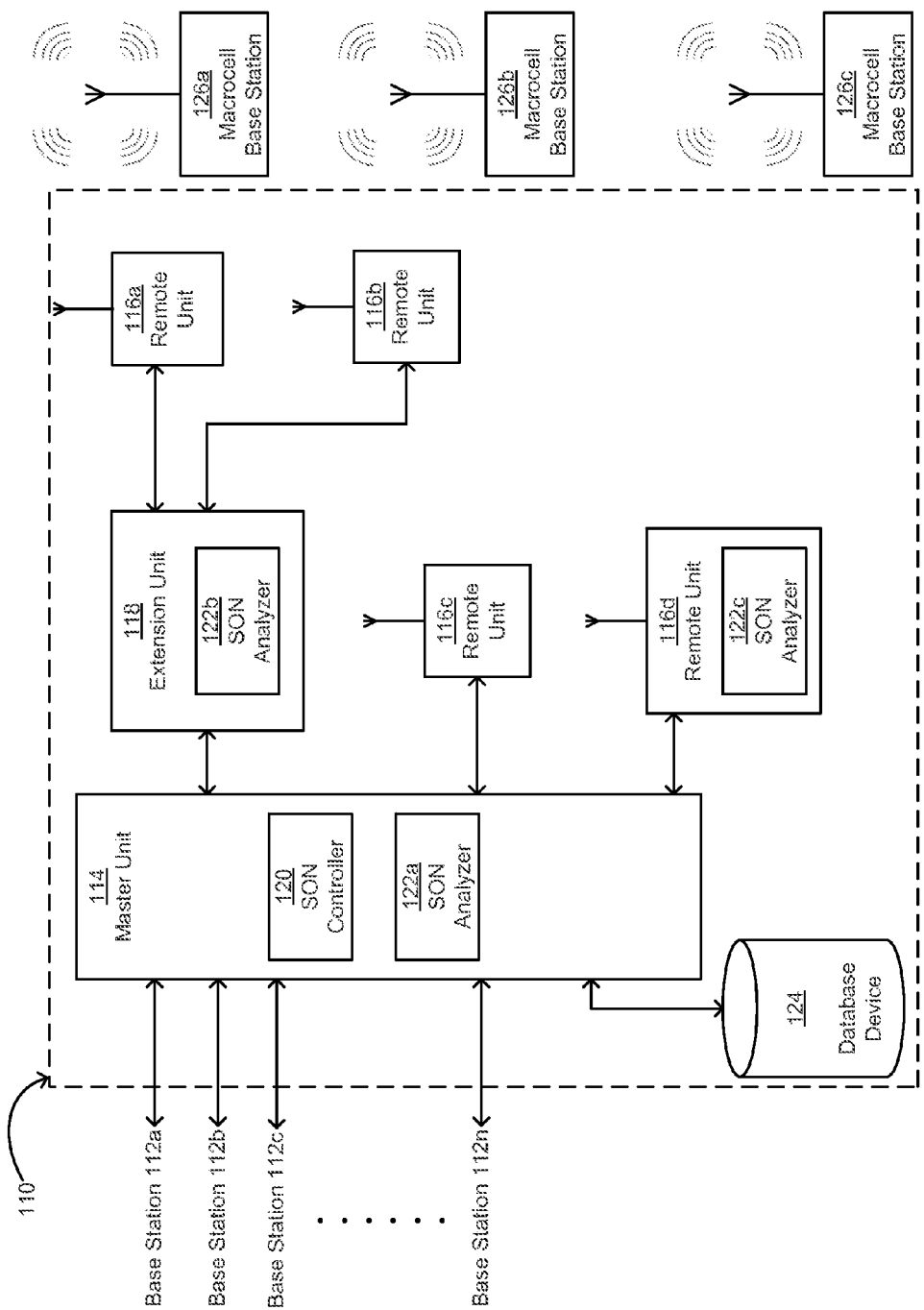
FIG. 1 is a block diagram of an example of a distributed antenna system.

FIG. 1 depicts an example of a DAS 110 in communication with one or more base stations 112a-n, which may be base transceiver stations. The DAS 110 can include a master unit 114, remote units 116a-d, and an extension unit 118. The DAS 110 may be positioned in an area of low signal coverage, such as the interior of a building, to extend wireless communication coverage. Extending wireless coverage can include communicating signals between base stations 112a-n and wireless devices positioned in a coverage area of the DAS 110.

The master unit 114 can receive downlink signals from one or more base stations 112a-n via a wired or wireless communication medium. The master unit 114 can also provide uplink signals to the base stations 112a-n.

The master unit 114 can communicate uplink and downlink signals between the base stations 112a-n and one or more remote units 116a-d distributed in the environment to provide coverage within a service area of the DAS 110.

The master unit 114 can convert downlink signals received from the base stations 112a-n, such as RF signals, into one or more digital data streams. A group of signals represented by digital data streams can form a band set. The master unit 114 can include circuitry, such as summers or multiplexers, configured to combine the digital data streams within a band set into a band stream. The band stream may be a single digital data stream that includes the digital data streams representing the signals in a band set. In some aspects, combining the digital data streams can include summing or adding signals within a band set. In other aspects, combining the digital data streams can include multiplexing the digital data streams into a serialized band stream.

The master unit 114 can provide downlink signals, such as digital data streams, to some of the remote units, such as remote units 116a-b via an extension unit 118. A non-limiting example of an extension unit is a transport extension node. The extension unit 118 can extend the range of the master unit 114. A master unit 114 may transmit optical downlink signals over an optical fiber link to extension unit 118. The extension unit 118 can convert the optical downlink signals to electrical downlink signals and provide the electrical downlink signals to remote units 116a-b over a copper cable, such as a coaxial cable, or other suitable communication medium.

The master unit 114 can also directly provide downlink signals to the remote units, such as remote units 116c-d. Directly providing downlink signals can include, for example, communicating the downlink signals from the master unit 114 to the remote units 116c-d without the downlink signals being received by a separate communication device, such as a transport extension node or other device, in the signal path between the master unit 114 and a remote unit.

The remote units 116a-d can convert digital data streams to RF signals. The remote units 116a-d can amplify the downlink signals and radiate the downlink signals using antennas to a number of different wireless devices, such as (but not limited to) cellular phones, operating in the environment of the DAS 110. A non-limiting example of a remote unit is a universal access point.

In an uplink direction, the remote units 116a-d can receive uplink RF signals, convert them to digital data streams, and provide the uplink digital data streams to the master unit 114 or the extension unit 118. The extension unit 118 can combine uplink digital data streams into combined digital data streams, such as band streams, and provide the combined digital data streams to the master unit 114. In some aspects, the master unit 114 can convert uplink digital data streams received from the remote units 116a-d and/or the extension unit 118 into uplink RF signals. The master unit 114 can provide the uplink RF signals to the base stations 112a-n. In other aspects, the master unit 114 can convert uplink digital data streams received from the remote units 116a-d into digital signals formatted for transmission to the base stations 112a-n that communicate using digital signals, in a standardized digital format or otherwise.

The master unit 114, extension unit 118, and remote units 116a-d can communicate via communication transport links. A communication transport link can include one or a series of physical connections over which a remote unit can communicate with the master unit 114 directly or through the extension unit 118. A communication transport link can include any type of communication medium capable of transporting signals between the master unit 114, the extension unit 118, and/or the remote units 116a-d.

Although the DAS 110 is depicted as including one master unit 114, one extension unit 118, and four remote units 116a-d, any number (including one) of each can be used. For example, a DAS 110 may include dozens of extension units and hundreds of remote antenna units.

The DAS 110 can also include SON components, such as SON controller 120 and one or more SON analyzers 122a-c. The SON controller 120 is shown as being located in the master unit 114, but the SON controller 120 can be located in other components of the DAS 110, as a separate component of the DAS 110, or in a device external to the DAS 110. In some aspects, the DAS includes one SON analyzer located in a component of a DAS.

Each of the SON analyzers 122a-c may be capture and analysis sub-systems that can analyze signals or other information associated with the DAS 110 and provide analysis results to the SON controller 120. The SON controller 120 can output commands for changing operation of a component in the DAS 110 in response to the analysis results and/or information stored locally or stored remotely, such as in a database device 124 in communication with the master unit 114 but remote from the DAS 110.

DAS 110 may provide mobile telecommunication coverage for an area and be located close to macrocell coverage areas, such as areas serviced by macrocell base station 126a by a first carrier, macrocell base station 126b by a second carrier, and macrocell base station 126c by a first carrier.

Figure 2:
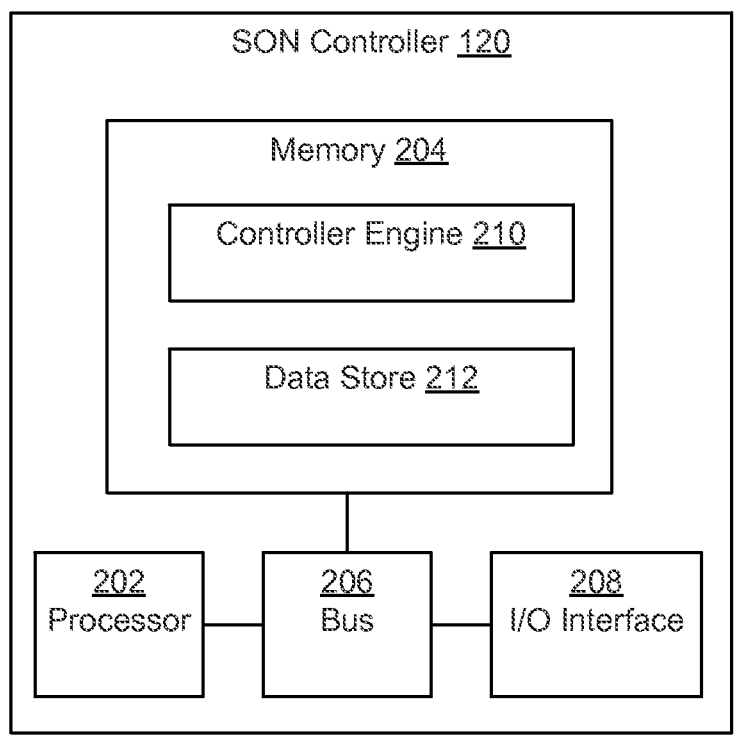
FIG. 2 is a block diagram of an example of a self-optimized network controller.

FIG. 2 depicts an example of the SON controller 120. Other configurations and examples may, of course, be utilized. The SON controller 120 may be any device that can process data and execute code that is a set of instructions to perform actions. The SON controller 120 includes a processor 202, a memory 204, a bus 206, and an input/output (I/O) interface 208. The memory 204 includes a controller engine 210 and a data store 212.

The processor 202 can execute code stored on a computer-readable medium, such as the memory 204, to cause the SON controller 120 determine a command and output the command to change operation of a component of a DAS. Non-limiting examples of a processor 202 include a microprocessor, an application-specific integrated circuit ("ASIC"), a field-programmable Gate Array ("FPGA"), or other suitable processor. The processor 202 may include one processor or any number of processors.

The processor 202 can access code stored in the memory 204 via a bus 206. Memory 204 may be any non-transitory computer-readable medium capable of tangibly embodying code and can include electronic, magnetic, or optical devices. Non-limiting examples of a memory 204 include random access memory (RAM), read-only memory (ROM), magnetic disk, an ASIC, a configured processor, or other storage device. Bus 206 may be any device capable of transferring data between components of the SON controller 120. Bus 206 can include one device or multiple devices. Instructions can be stored in the memory 204 as executable code. The instructions can include processor-specific instructions generated by a compiler and/or an interpreter from code written in any suitable computer-programming language.

The controller engine 210 can receive through an I/O interface 208 inputs such as analysis results from one or more of the SON analyzers 122a-c and information from database device 124 in FIG. 1. The controller engine 210 can also cause data to be stored in data store 212 and access the data in data store 212. For example, the controller engine 210 can store a history of measurements and use the stored history of measurements to perform DAS configuration changes at a later date.

Figure 3:
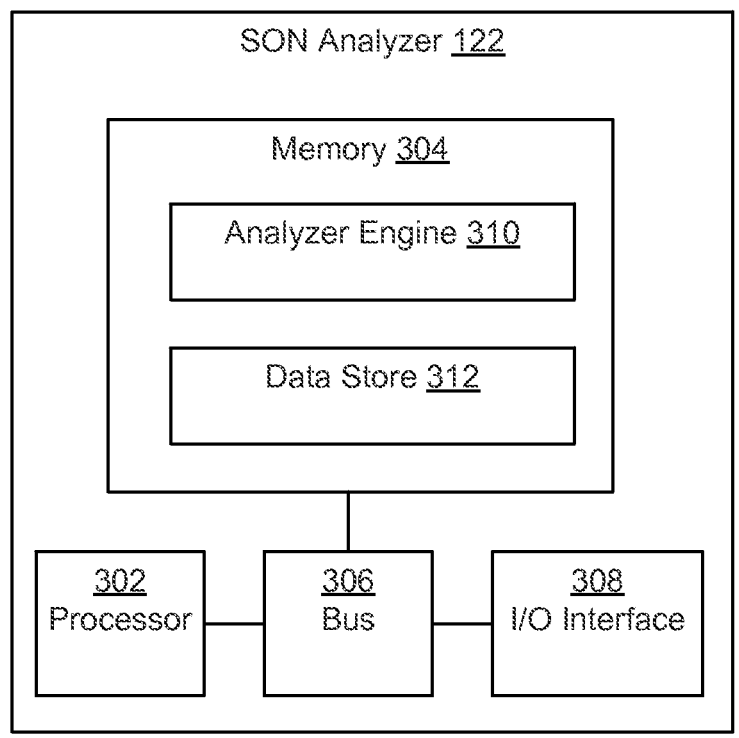
FIG. 3 is a block diagram of an example of a self-optimized network analyzer.

FIG. 3 depicts an example of a SON analyzer 122. Other configurations and examples may, of course, be utilized. The SON analyzer 122 is similar to the SON controller 120 of FIG. 2 and may be any device that can process data and execute code that is a set of instructions to perform actions. The SON analyzer 122 includes a processor 302, a memory 304, a bus 306, and an input/output (I/O) interface 308. The memory 304 includes an analyzer engine 310 and a data store 312.

The processor 302 can be similar to the processor 202 of FIG. 2 and can execute code stored on a computer-readable medium, such as the memory 304, to cause the SON analyzer 122 to receive signals and information, analyze the signals and information, and output analysis results. The processor 302 can access code stored in the memory 304 via a bus 306. Memory 304 can be similar to memory 204 of FIG. 2, and may be any non-transitory computer-readable medium capable of tangibly embodying code and can include electronic, magnetic, or optical devices. Bus 306 may be any device capable of transferring data between components of the SON analyzer 122.

The analyzer engine 310 can receive through an I/O interface 308 inputs such as signals and information from the DAS 110, analyze the signals and information, and provide the analysis results through the I/O interface 308 for receipt by the SON controller 120. In some aspects, the analyzer engine 310 can be triggered to analyze signals or other information based on a command from a SON controller or a device external to the DAS 110.

Examples of SON Capabilities

Figure 4:
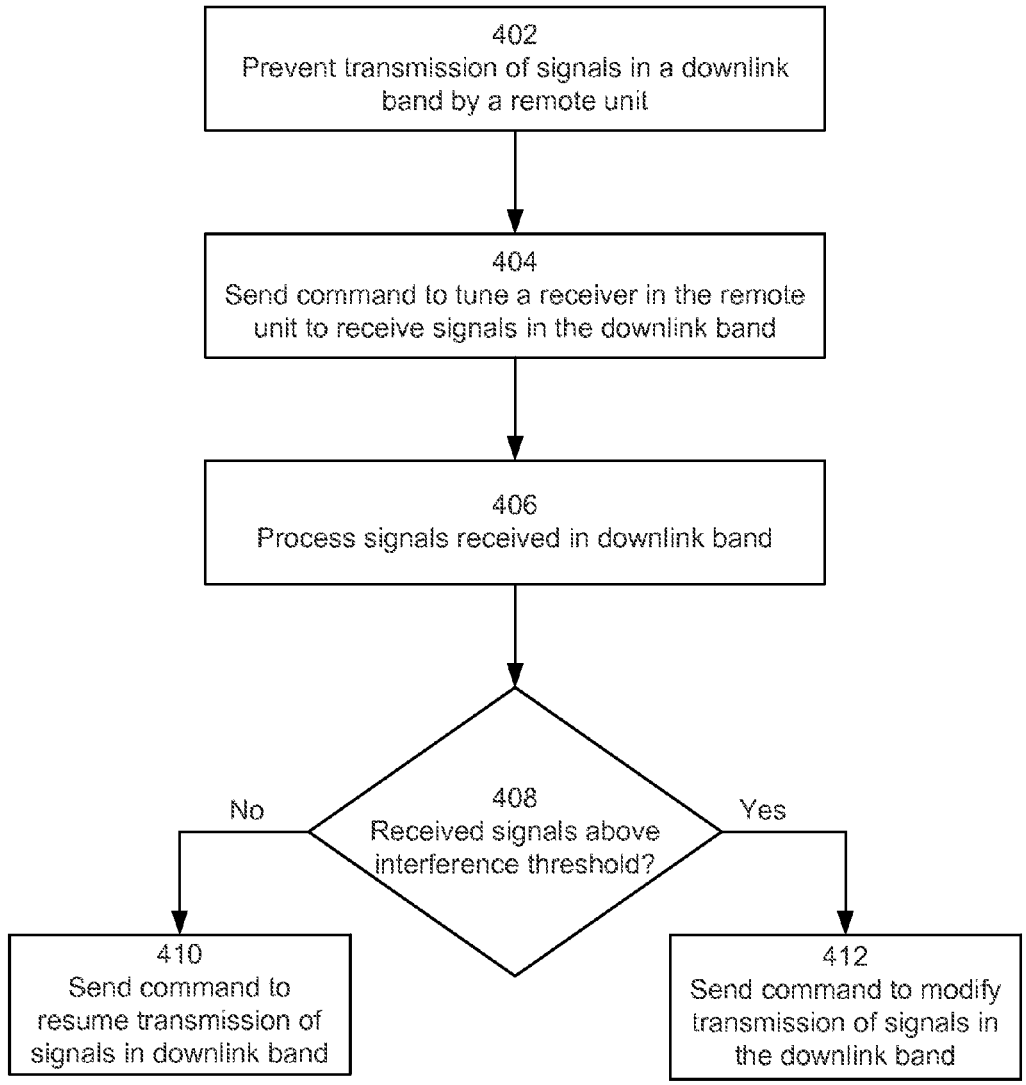
FIG. 4 is a flow chart of an example of a process for optimizing a distributed antenna system based on interference in a downlink band.

A DAS according to some aspects, can be located close to (or in some cases in) an environment served by a macrocell. Signals from the macrocell may be strong enough to interfere with one or more signals transmitted by a remote unit of the DAS. For example, macrocell interface may be caused by signals in a downlink band in which the remote unit also transmits signals. There may also be sources of interference other than a macrocell. The SON controller 120 and SON analyzer 122 can detect and measure sources of interference in an uplink (e.g., a signal path from a mobile device to the master unit 114) band and/or a downlink (e.g., a signal path from the master unit 114 to the mobile device) band and modify operation of the DAS 110 in response to that analysis. FIG. 4 is a flow chart that depicts one example for detecting interference in a downlink band and modifying operation of the DAS 110.

In block 402, the SON controller 120 outputs a command for preventing the DAS 110 from transmitting signals in a selected downlink band by a remote unit, such as one of the remote units 116a-d, a subset of the remote units 116a-d, or all of the remote units 116a-d. The downlink band can be selected in the order of downlink bands being transmitted by the DAS 110, a list of potential macrocell bands, or otherwise.

In block 404, the SON controller 120 sends a command to tune a receiver in the remote unit to receive signals in the downlink band. Receivers in remote units 116a-d can be tuned to selected uplink bands for the DAS to receive signals from mobile devices in a coverage area. The receiver can respond to the command from the SON controller 120 by changing operation to receive the downlink band rather than the uplink band.

Signals in the downlink band can be received by the remote unit. In block 406, a SON analyzer 122 located in the remote unit, in the extension unit 118, or in the master unit 114, processes the signals received in the downlink band. In some aspects, the signals are digitized and processed by the SON analyzer 122 to detect RF power in the downlink band, detect the power of individual RF channels in the downlink band, determine the modulation type of the channel, and decode information on the detected channel. The SON analyzer 122 can send the analysis results to the SON controller 120. In some aspects, the SON analyzer 122 analyzes the signal power level of the pilot signal instead of the composite signal level, which can depend on traffic level, in each channel, portion of a channel, or multiple portions of the downlink band.

In block 408, the SON controller 120 determines, based on the analysis results, whether the received signals are above an interference threshold. The interference threshold may be a pre-set threshold that is defined by the user of the DAS 110 or pre-defined within the DAS 110 during manufacturing. The interference threshold may be stored locally or remotely and accessed by the SON controller 120.

If the received signals are not above the interference threshold, the SON controller 120 sends a command to resume transmission of DAS signals in the downlink band and causes the receiver to be re-tuned to the uplink band instead of the downlink band, in block 410. The command may be sent to one or more components of the master unit 114 and/or a remote unit. If the received signals are above the interference threshold, the SON controller 120 sends a command to modify transmission of signals in the downlink band, in block 412. For example, the SON controller 120 can cause the gain applied to the signals in the downlink band to increase and cause the receiver to be re-tuned to the uplink band rather than the downlink band. If the received signals are significantly above the interference threshold, the SON controller 120 can cause downlink signals to be transmitted in a different downlink band or a different portion of the downlink band.

The measurement and enabling/disabling of signal transmission by the remote unit can be performed upon user command, automatically during initial commissioning, or automatically scheduled during times that are least likely to impact system interference (e.g., during nighttime hours). If performed automatically at certain intervals, hysteresis can be used to prevent frequent enabling/disabling of signals at a remote unit. In addition, a history of past measurements can be stored for the remote unit and the history can be used to evaluate whether to enable or disable the signal at the remote unit. In other aspects, a remote unit can include a dedicated receiver for downlink bands rather than tuning a receiver normally used for uplink signal reception. In addition or alternatively, this process can be used to measure transmit power by neighboring remote units as received by a particular remote unit and to adjust the power level of each remote unit in the case of multiple factors.

Figure 5:
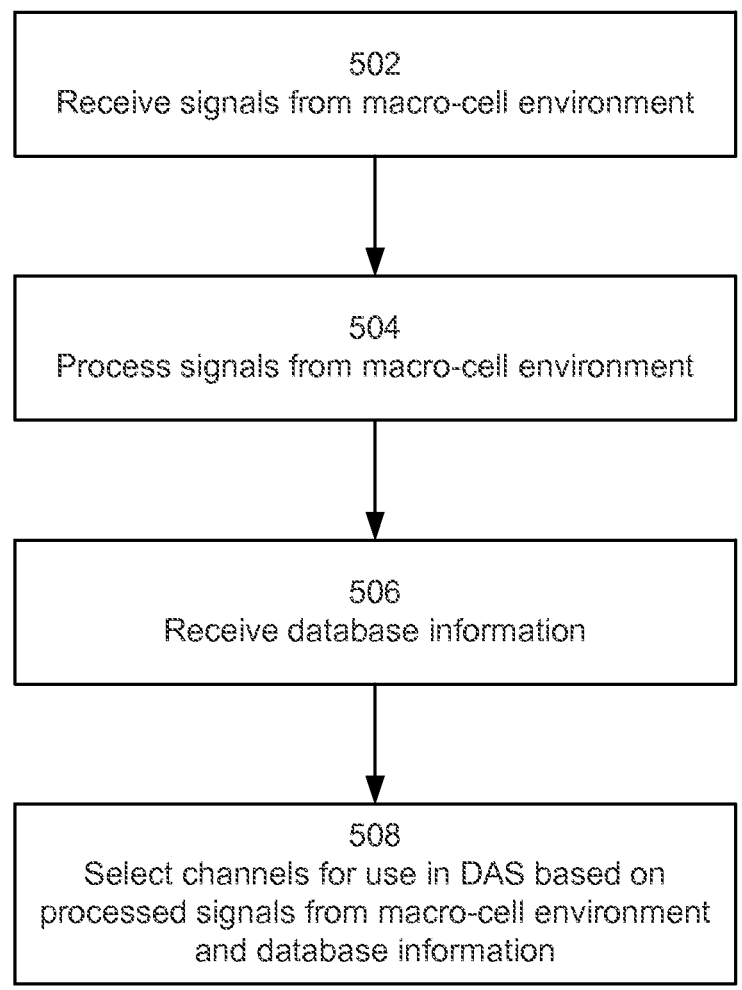
FIG. 5 is a flow chart of an example of a process for selecting channels to use in a distributed antenna system.

SON capabilities can include selecting channels for use in the DAS 110. FIG. 5 depicts an example of a process for doing so. In block 502, signals from a macro-cell environment are received by a SON analyzer 122. In some aspects, the SON analyzer 122 can perform received signal strength indication (RSSI) of the wireless bands to identify active channels within the wireless bands. The number of channels can be estimated from the centers of RSSI energy. Local or remote database information can be used to determine on which frequency to expect a wireless communication channel. A potential macro-cell channel candidate list that is sorted according to the RSSI strength and the channel bandwidth can be maintained for a predetermined depth. In addition, a second list of channels where no significant activity has been detected can be maintained as a list of potential DAS-cell channel candidates. This list can be sorted according to the RSSI level or the change from the noise level and its available bandwidth, ranking the entry the highest that has the lowest RSSI and the highest bandwidth.

In some aspects, the SON controller 120 can initiate the scan of the SON analyzer 122 of wireless communication bands to measure RSSI and decode identified signals present in the coverage area of the DAS. The scanning can be performed by tuning the receive section of one or more of the remote units 116a-d to downlink frequencies or bands. Transmit portions of the remote unit used for scanning (and potentially one or more adjacent remote units) can be caused by the SON controller 120 to temporarily pause transmission during scanning. Scanning can be performed on all bands or just a subset of bands, and can be periodically repeated.

In block 504, the SON analyzer 122 processes the signals from the macro-cell environment. For example, the SON analyzer 122 can periodically decode the signals from the potential macro-cell channel candidate list and determine parameters, such as the absolute frequency of the decoded channel with respect to the internal frequency reference, the timing offset to the internal timing reference, the absolute timing such as the frame number, and key network parameter such as Mobile Country Code, Mobile Network Code, Cell ID, Location Area Code, list of neighbor cells, etc. The SON controller 120 can maintain the results in a database.

In block 506, the SON controller 120 receives database information stored locally or remotely in database device 124 or otherwise. The database information can include the parameters and/or other types of information related to the macrocell and DAS. For example, the database information can include scanning results for each remote unit individually or on a per operator basis, identification of a comment set of cells according to signal strengths and presence counted in each remote unit, and/or cell parameters (e.g., for GSM network, MCC, MNC, CellID, LAC, BSID, and Neighbor Cells). In some aspects, the database information includes a location of the DAS system. For example, the SON controller 120 can determine the location of the DAS system using user-configured location data, GPS receiver data, macro-cell trilateration functions, macro-cell system location information (CellID or the location coordinates when transmitted), and/or map data, such as data from GOOGLE MAPS™. The SON controller 120 can use the information to determine the position of a mobile device from the presence of the wireless carriers received by the device. The SON controller 120 may also determine and store the assigned frequencies for each operator that is planned to be assigned to the DAS 110 using the determined location and/or information from public databases, private databases, the FCC database or information published by the European Communications Office. Map information to determine the boundaries of the assigned frequencies can also be retrieved from local or remote databases.

The SON controller 120 can determine whether the operator has assigned a preferred channel or set of channels to be used for a SON-type network from database information. As an alternative, the channel or set of channels present in the neighbor list of the detected macro-cell signals that do not show any RSSI activity may be used.

In block 508, the SON controller 120 selects channels for use in the DAS 110 based on the processed signals from the macro-cell environment and database information. For example, the SON controller 120 can analyze the list of potential DAS-cell channel candidates and select channels that are preferred, have the lowest RSSI, or have the highest distance in frequency to high RSSI channels. The SON controller 120 can output commands to components of the DAS 110 to configure the components to transmit and/or receive the selected channels. For frequency and timing synchronization, the SON controller 120 can use the strongest received channel from one operator. If the frequency and timing is different for signals in different RF bands for the same operator, the SON controller 120 can maintain synchronicity with signals from both bands. A similar process can be applied to signals from the same operator employing different standards.

Multi-Base Transceiver Station Distributed Antenna System

A DAS according to some aspects may be an MB-DAS with configurable distribution that may use active antenna units. The MB-DAS can include a centralized host or master unit housing BTS cards. In other aspects, one or more remote units of the MB-DAS includes BTS cards that can receive network protocol data, such as internet protocol data, from a host or master unit.

BTS cards may be capacity elements that are connected to a network backbone via IP-based interfaces. Wireless communication signals can be communicated to and from the BTS cards via a digital interface as complex digital baseband signals or complex digital or real digital intermediate frequency signals at a relatively low sampling rate. A BTS card may be associated with a single operator or a multiple operator. The BTS card can be dedicated to the generation and decoding of signals that are targeted for transmission and reception in a single wireless communication RF band or be dedicated to multiple wireless communication RF bands. Multiple bands can be communicated to and from the BTS card using individual busses for each band or using a multiplexed data interface.

Figure 6:
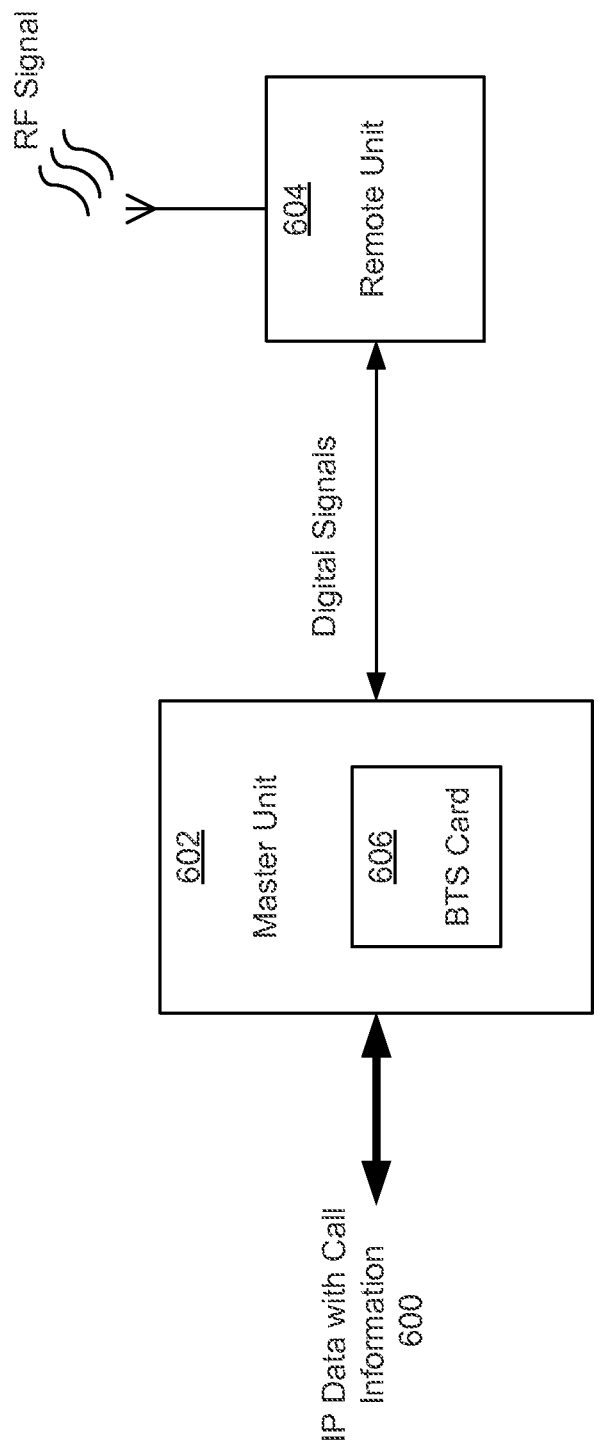
FIG. 6 is a block diagram of an example of a multi-base transceiver station distributed antenna system.

FIG. 6 depicts one example of an MB-DAS. The MB-DAS includes a master unit 602 that can transceive IP data with call information 600 over an IP network, and can transceive digital signals with a remote unit 604 that can wirelessly transceive RF signals for providing coverage in an environment. In some aspects, the remote unit 604 is an active antenna unit. Included in the master unit 602 are one or more BTS cards 606.

The digital wireless downlink signals of each BTS card 606 may be re-sampled, converted to an individual digital IF signal (represented as complex or real samples), digitally conditioned, and digitally summed or otherwise combined with other digital downlink signals from BTS cards to a summed digital IF signal stream. Each digital IF signal stream can be designated to be transmitted in the same wireless communication RF band. To frequency position the signals of each BTS card 606 within the summed digital IF stream by the system controller, the target RF center frequency of the BTS card signal can be determined. The summed digital signal can be multiplexed and framed for transport via a digital communication link to a signal processor board on which it can be further digitally switched and summed with other summed signal streams into a digital zone signal stream. The zone signal stream can be multiplexed and framed onto a transport stream, which can be a parallel or serial link. In one aspect, the transport stream is a serial digital stream such as a 10 Gb/s Ethernet data link on an optical fiber or CAT6a cable. Alternatively, higher bit rates, such as 40 Gb/s or 100 Gb/s, as well as lower bit rate connections can be used for the transport. The transport stream can be provided to the remote unit 604 directly or through an extension unit.

Figure 7:
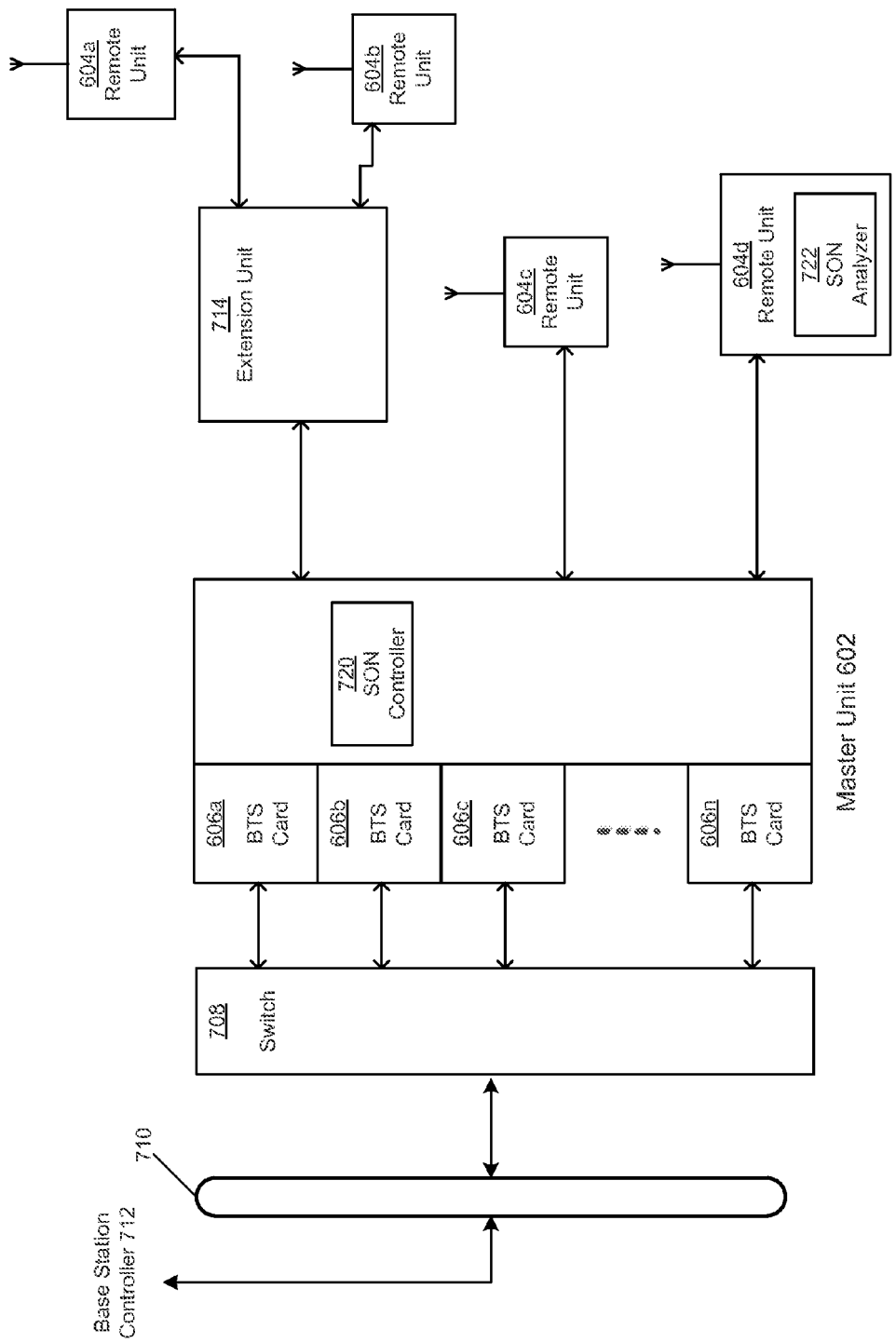
FIG. 7 is a block diagram of the multi-base transceiver station distributed antenna system of FIG. 6 in communication with a base station controller according to one example.

An MB-DAS according to various aspects may or may not include SON capabilities. FIG. 7 depicts the MB-DAS having SON capabilities. The MB-DAS includes a master unit 602, remote units 604a-d, and an extension unit 714. The master unit 602, through the BTS cards 606a-n, can communicate with a switch 708 that allows for network communication to the base station controller 712 over an IP backbone 710 via Abis or other interface, such as Iu or S1. In other aspects, the MB-DAS includes the switch 708. In some aspects, the master unit 602 communicates with other components, such as a mobile telephone switching office, directly instead of through the base station controller 712. In other aspects, the base station controller 712 is replaced with a radio network controller ("RNC"), for example in a 3G-UMTS network. In still other aspects, such as in implementations in a 4G LTE network, no BSC, RNC or equivalent is used. Instead, the BTS cards 606a-n, which would be eNodeB cards, include RNC functionality and can communicate directly with a core network. It should be noted that in 3G-UMTS and 4G LTE, base stations with neighboring cells can have a direct interconnection that is Iur (for 3G UMTS) or X2 (for 4G LTE).

The master unit 602 can communicate with the remote units 604a-d directly or through the extension unit 714. The extension unit 714 can receive the transport stream and fan (i.e., distribute) it out to multiple remote units. The fan out may be performed without any change to the stream. In systems having multiple master units, the extension unit 714 may multiplex or digitally sum multiple zone streams from different transport streams.

A remote unit can receive the transport stream and perform bit & clock recovery, conversion back to a parallel data stream, de-framing, and de-multiplexing of the zone streams. Each zone stream can be provided to an RF back-end that can convert it from a digital IF signal to an analog RF signal for transmission via an antenna to wireless devices.

In the uplink direction, each of the remote units 604a-d can receive the wireless signal from the mobile device and convert the RF signal into a digital sampled signal represented by either real or complex digital samples. The uplink digital signals can be in the same or similar format as the downlink zone streams, and can be further processed, filtered, digitally up- or down-converted, re-sampled, amplitude and phase conditioned, digitally summed, multiplexed with other digital signals, and framed and serialized for transport via a digital transport link. The link may connect to the extension unit 714 or to the master unit 602. In the extension unit 714 or the master unit 602, the serial data stream can be received, bit & clock recovered, converted back to a parallel data stream, de-framed, de-multiplexed, potentially processed, and potentially digitally summed with other digital signals from one or more different remote units 604a-d. Digital signals that are digitally summed may be prevented from overlapping in the frequency spectrum for later separation. Signals can be prevented from overlapping by keeping them on different frequencies in their digital spectral distribution and positioning or through multiplexing them with other digital data streams.

The extension unit 714 or the master unit 602 can sum the uplink signals according to the zone distribution matrix and provide them for further processing, or can send provide them without adding. Before sending uplink digital signals back to the BTS cards 606a-n, the zone stream may be digitally conditioned, filtered, converted to an individual digital (represented as complex or real samples) IF signal, and re-sampled. The sequence of the processes listed does not necessarily represent the sequence of their application to the digital signal.

Included in the master unit 602 is a SON controller 720, which may be configured similar to SON controller 120 of FIG. 2, and capable of outputting commands for changing operation of the MB-DAS. Remote unit 604d includes a SON analyzer 722 that may be configured similar to SON analyzer 122 of FIG. 3, and capable of analyzing signals and other information about the MB-DAS and providing analysis results to the SON controller 720. In other aspects, each of the other remote units 604a-c, the master unit 602, and/or the extension unit 714 includes a SON analyzer. The SON controller 720 and SON analyzer 722 can provide SON capabilities, such as those described previously and additional SON capabilities.

For example, a remote unit can provide the downlink received signals from the RF environment to support the SON capabilities. Receiving downlink signals can include tuning the uplink frontend to downlink frequencies while the downlink back-end is deactivated. The SON analyzer 722 can perform the capture, filtering, frequency conversion, demodulation, decoding, frequency & timing offset determination, and data extraction. In order to allow the analysis to be performed on one remote unit, other remote units that would typically be summed together with the signal of the remote unit can be paused for that time period. Alternatively, the capture can be taken at the remote unit or at the input of the extension unit 714 and transported via a dedicated data transport link to the unit that includes the SON analyzer 722. The SON controller 720 can coordinate the capture and analysis function, retrieve the results from the SON analyzer 722, store it locally or remotely and distribute it to the various elements in the systems.

The SON controller 720 can schedule the monitoring process that can analyze the downlink spectrum of the relevant wireless network bands. It can schedule the deactivation of the downlink path of one or more of the remote units 604a-d, the tuning of a remote unit receiver to downlink bands, the capture of samples, the transport to the SON analyzer 722, the processing of the captures, and the presentation of the results.

Another example is synchronization in frequency and in timing. An internal clock or alternatively a clock offset to the internal clock dedicated for each operator can be maintained by the SON controller 720 and provided to the BTS cards 606a-n. Each BTS card can generate wireless signals according to the in-synch with the macro-cell network. An absolute timing such as the absolute frame count of the operator can also be provided. For CDMA signals, a GPS accurate clock may be used.

Another example is macrocell-to-DAS-cell hand-in configuration. To allow hand-in from the macrocell network into the MB-DAS-cell network the channels used by the MB- DAS-cell can be in the neighbor list of the macro-cell network. This can be from a mobile device user entering the areas of the MB-DAS system with an active data session or a voice call. Having a proper hand-in can transfer the mobile device directly to the MB-DAS-cell and remove the traffic from the macrocell.

A localized broadcast control channel ("BCCH") generated within the master unit 602 in one of the BTS cards 606*a-c* with limited signaling can be used to facilitate hand-ins. The BCCH can be on the channel list of the adjacent macro-cells for a hand-in. The localized BCCH can be a fully functional BCCH that offers traffic support, or it can be a reduced-feature-set BCCH that is used to allow the hand-in from the macrocell and hands the call or data session directly off to a designated fully functional MB-DAS-cell.

Another example is DAS-cell-to-macrocell hand-off configuration. If a user with a mobile device is leaving the MB-DAS coverage area and into the macrocell network coverage area, a proper hand-off can be used to allow uninterrupted data and/or voice communication when the transition is occurring. The macrocell channels can be added to the neighbor cell list in the SON controller 720. The BTS card associated with the hand-off can be connected with the base station controller 712 and mobile switch to support the hand-off.

Another example is mapping of remote units with macrocell hand-off and hand-in support. One feature of an MB-DAS cell network may be to capture the possible traffic in the confined area and not have the macrocell network be burdened with high-density traffic from the area that the MB-DAS network attempts to cover. Mobile devices operated at the border of the MB-DAS network can hand-over to the macrocell network if it is expected that the mobile device will leave the MB-DAS network coverage area. Therefore, a hand-over can be supported in select areas and omitted in others. For example, remote units close to entrances to the building or structure may be candidates to support hand-in or hand-off to the macrocell network. Entrances that are considered emergency exits may be supported as well. Hand-over support in areas with a high number of transitions between the MB-DAS and the macrocell network can be provided. Hand-over can be suppressed in other areas, such as windows, where the macrocell network signals may be strong. The suppression can be achieved by excluding the macrocell channels in the neighbor cell lists of the signals radiated in the remote units.

Each of the BTS cards 606*a-n* may be a plug-in card capable of being plugged into a donor card slot using a similar type of interface to a backplane as a donor card. Signals from the BTS cards 606*a-n* can be distributed to remote units digitally. BTS cards 606*a-n* can be a hardware implementation or a software implementation using a FPGA or a DSP.

BTS cards 606*a-n* can be various types and include various configurations. For example, a BTS card can be a femto, pico, nano, or micro BTS cards. Femto BTS cards can indicate a low capacity. A pico BTS card can indicate a low-to-medium capacity. A nano BTS card can indicate a medium-to-high capacity. A micro BTS cards can indicate a full capacity. A BTS card can be a plug-in BTS resource to plug into the donor card slot within master unit 602 or extension unit 714. A BTS card can be an internal or an external card. A BTS card can combine several femto, pico, nano, and/or micro BTS signals into one stream to be sent to a specific number of remote antenna units. BTS cards can be combined with donor cards that have either an analog RF interface or a digital standardized interface (e.g., CPRI, OBSAI, and ORI) or both. A BTS card can have an IP backbone link that may use Ethernet LAN or WAN. A BTS card can use knowledge of the location of the MB-DAS. The location may be received from a location server, such as a server including a centralized GPS receiver, or the location can be determined by trilateration of the detected macrocell that is proximate to the MB-DAS. A BTS card can configure cells for the MB-DAS by subdivision or combining BTS cells on different frequencies to provide increased capacity, depending on available free frequencies in the macrocell environment.

In some aspects, BTS cards 606*a-n* can have an analog IF interface to an analog DAS that distributes signals in analog form instead of digital. Instead of processing the digital signals, the analog IF signals from the BTS cards 606*a-n* can be processed (e.g., frequency converted through mixing, filtered, amplified or attenuated, combined with other signals or provided through a splitter, transported via an analog link such as coax cable or analog optical RF signal via optical fiber, amplified and radiated via passive or active antenna units.

Figure 8:
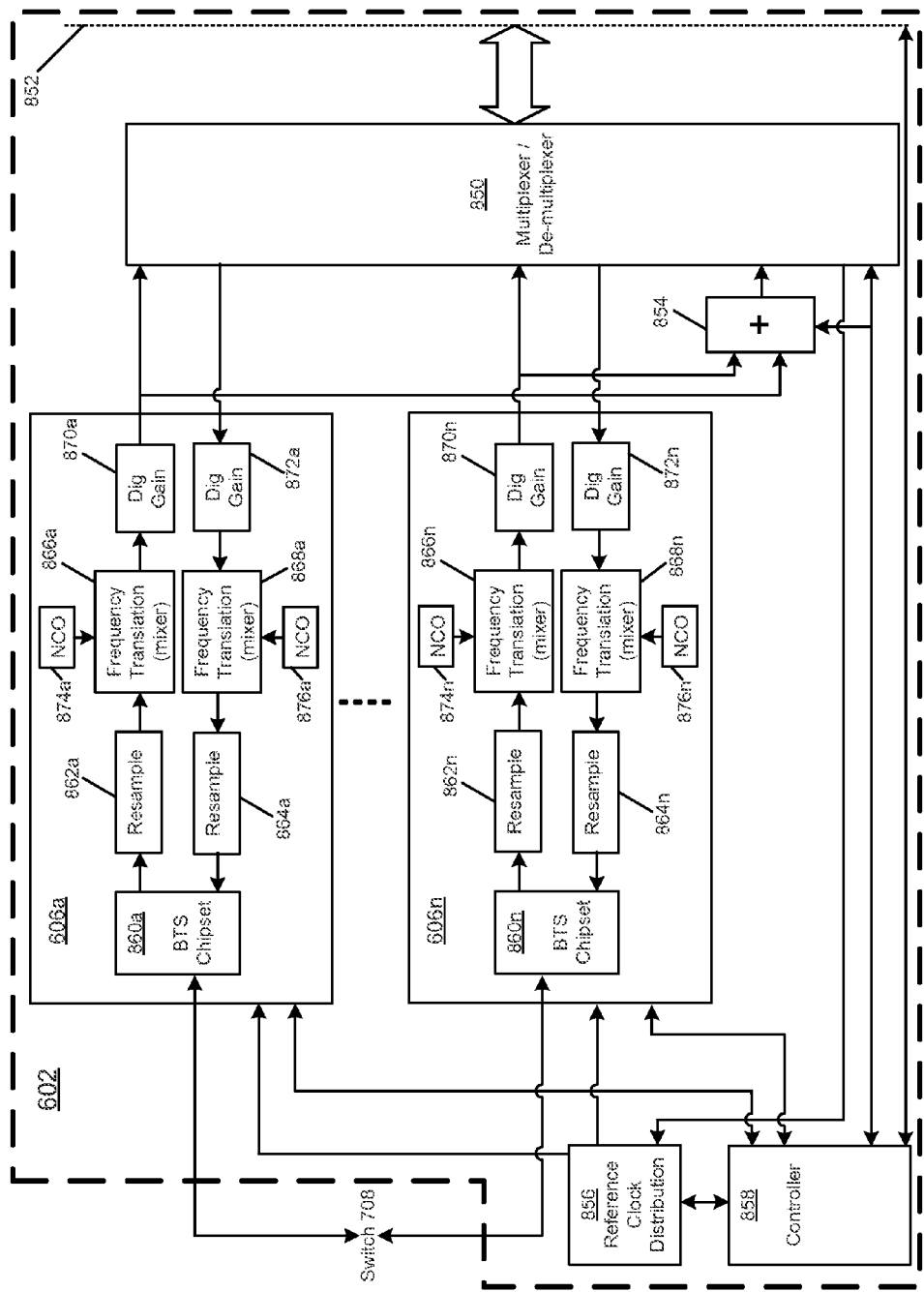
FIG. 8 is a block diagram of a master unit of the multi-base transceiver station distributed antenna system of FIG. 7 in communication with a switch according to one example.

FIG. 8 depicts an example of part of the master unit 602 in communication with the switch 708. The master unit 602 includes a multiplexer/de-multiplexer 850, a backplane 852, a summer 854, a reference clock distribution component 856, and a system controller 858. Also depicted are BTS cards 606*a-n,* certain details according to some aspects are shown.

For example, each of the BTS cards 606*a-n* can include a BTS processor device such as BTS chipset 860, resample devices 862, 864, frequency translation components 866, 868, and digital gain components 870, 872. In a downlink direction (i.e., toward a wireless device), each of the BTS chipsets 860*a-n* can receive data from the IP switch 708 as internet protocol data, or data in another network protocol. The BTS chipsets 860*a-n* can decode the data, convert the data to an appropriate wireless communication protocol, digitize the data, and modulate the digitized data. The modulated digital data can be resampled by resampler devices 862*a-n* to, for example, increase the sample rate of the modulated digital data. In other aspects, resampler devices 862*a-n* are not used, or the resampler devices 862*a-n* resample at the same rate by which the digitized data was generated. The modulated digital data can be provided to frequency translation components 866*a-n* that, using a local oscillator 874*a-n* (a numerically controlled oscillator (NCO), for example, as depicted in FIG. 8), can move the modulated digital data in frequency, up or down, such that the modulated digital data is centered around a certain frequency. Moving the modulated digital data to a different frequency can facilitate summing or otherwise combining the modulated digital data with modulated digital data from other BTS cards.

Gain may be applied to the modulated digital data by digital gain components 870*a-n*. Digital gain may be used to level each of the data signals prior to summing. The digital interface may use all the bits available to represent the digital signal. For example, if the bit width of the signal is sixteen bits, the signal level can traverse the sixteen bits to represent the signal amplitude. The signals from a BTS card can be scaled such that when the signals are combined with signals from other BTS cards, the signals will not clip the output of the summer. For example, if two signals are combined, the BTS signals may be reduced by ½ prior to summing. If four BTS cards are summed, the signal can be reduced by ¼ prior to summing. The depth of the bit width of the output signal can be increased to avoid the loss of dynamic range. For example, the bit width may be increased by at least one bit for summing two signals.

Another use of the digital gain may be to control the level of the BTS BCCH (or pilot channel, beacon, or equivalent) in the downlink direction to control handover areas between two MB-DAS cells, each associated with one BTS card. The wireless device can measure BCCH (or equivalent) signal level to determine which BTS to which to lock. The signal level of the BCCH can be controlled to move the handover region away from high traffic areas when there is overlapping BTS coverage, such as in building entrances, lobbies, and elevators. The signal level of the BCCH can be controlled with the digital gain in the downlink direction to control which BTS card a wireless device locks to and to prevent handovers in high traffic areas.

The uplink and downlink gain can be adjusted to be equal so any gain adjustment performed to the downlink signal of a BTS card can be performed to the uplink path with the same amount of gain. In other embodiments, no gain is applied.

The modulated digital data from a BTS card can be provided directly to the multiplexer/de-multiplexer 850, provided to a summer 854 for digitally summing the modulated digital data with modulated digital data from one or more other BTS cards prior to being provided to the multiplexer/de-multiplexer 850, or both. The multiplexer/de-multiplexer 850 can multiplex the data into a serialized digital data stream that is provided to a backplane for digital transport to one or more remote units. The remote units, such as remote units 604a-d of FIG. 7, can convert the modulated digitized data to analog RF, amplify the analog RF, and cause the analog RF to be radiated by one or more antenna elements for receipt by wireless devices in a coverage area.

In the uplink direction (i.e., from the wireless devices), a remote unit can receive analog RF from a wireless device, convert the analog RF to digitized upstream data, and cause the digitized upstream data to be transported to the master unit 602 by multiplexing the data with other data to a serial data stream. The backplane 852 of the master unit 602 can receive the digitized upstream data and provide it to the multiplexer/de-multiplexer 850. The multiplexer/de-multiplexer 850 can de-multiplex the data and provide it to a proper BTS card. Digital gain components 872a-n can apply a gain to the digitized upstream data. Frequency translation components 868a-n, using a local oscillator 876a-n, can change the center frequency (up or down, but typically down) to a different frequency for further processing. The digitized upstream data may be resampled by resampler devices 864a-n to reduce the sample rate, and can be provided to the BTS chipsets 860a-n. The BTS chipsets 860a-n can demodulate the digitized upstream data, convert it to analog RF, and encode the analog RF into an Internet Protocol. The encoded data can be provided to the IP switch 708 for transport through an IP backbone to a base station controller.

The foregoing description of the aspects, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A distributed antenna system comprising:
    a master unit for transceiving signals with a plurality of remote units operable for wirelessly transceiving signals with mobile devices in a coverage area, wherein the master unit includes a plurality of base transceiver station cards adapted for:
        receiving call information in an internet protocol data from a network; and,
        generating digital signals including the call information from the internet protocol data;
    wherein the master unit is configured for determining a band for the digital signals based on a location of the distributed antenna system;
    a self-optimized network analyzer in a unit of the distributed antenna system; and
    a self-optimized network controller for outputting commands for changing operation of a component in the distributed antenna system in response to analysis results from the self-optimized network analyzer, wherein the self-optimized network controller is adapted for:
        preventing transmission of signals in a downlink band by a remote unit of the distributed antenna system;
        sending a command to tune a receiver in the remote unit to receive signals in the downlink band; and
        sending a command to the remote unit regarding transmission of signals in the downlink band in response to an indication from the self-optimized network analyzer about a comparison of processed signals received in the downlink band to an interference threshold.

2. The distributed antenna system of claim 1, wherein the self-optimized network analyzer is in a remote unit of the plurality of remote units and the self-optimized network controller is in the master unit.

3. The distributed antenna system of claim 1, wherein the self-optimized network analyzer and the self-optimized network controller are in the master unit.

4. The distributed antenna system of claim 1, wherein the self-optimized network controller is adapted for selecting channels for use in the distributed antenna system based on database information and signals from a macro-cell environment processed by the self-optimized network analyzer.

5. The distributed antenna system of claim 1, wherein each base transceiver station card includes:
    a base transceiver processor device adapted for decoding the internet protocol data, converting the call information to a wireless communication protocol, digitizing the call information converted to the wireless communication protocol, and modulating the digitized call information; and
    a frequency translation device adapted for frequency shifting the modulated digitized data,
    wherein the master unit includes a multiplexer adapted for multiplexing the modulated digitized data as the digital signals into a digital data stream for digital transport by a backplane to the plurality of remote units.

6. The distributed antenna system of claim 5, wherein each remote unit is adapted for:
    converting the digital signals to analog RF signals and causing the analog RF signals to be radiated at an antenna element;
    converting uplink analog RF signals received from a wireless device into uplink digital signals; and
    multiplexing the uplink digital signals for transport to the master unit.

7. The distributed antenna system of claim 6, wherein each base transceiver station card includes:
    a second frequency translation device adapted for frequency shifting the uplink digital signals de-multiplexed by the master unit,
    wherein the base transceiver processor device is adapted for demodulating the uplink digital signals, converting the demodulated uplink digital signals to uplink analog RF signals, and encoding the uplink analog RF signals into uplink internet protocol data.

8. The distributed antenna system of claim 7, wherein each base transceiver station card includes:
a first resample device adapted for resampling the modulated digitized data;
a second resample device adapted for resampling the uplink digital signals;
a first digital gain device adapted for applying a downlink gain to the modulated digitized data; and
a second digital gain device adapted for applying an uplink gain to the uplink digital signals.

9. The distributed antenna system of claim 1, wherein each base transceiver station card is adapted for determining the location of the distributed antenna system with respect to a geographic location of a macro-cell environment.

10. The distributed antenna system of claim 1, wherein the master unit includes:
a summer adapted for summing modulated digitized data from the plurality of base transceiver station cards and providing the summed digitized data to a multiplexer configured for multiplexing the summed digitized data as the digital signals for digital transport to the plurality of remote units.

11. The distributed antenna system of claim 1, wherein the self-optimized network analyzer is in a remote unit of the plurality of remote units,
wherein the remote unit is configured for scanning, with a receiver of the remote unit during a first period of time, a spectral environment of the remote unit, wherein the spectral environment comprises frequencies used to transmit signals within a range of the remote unit;
wherein the self-optimized network controller is further configured for:
outputting a first command for changing operation of the remote unit during the first period of time based on analysis of the spectral environment scanned during the first period of time, and
outputting a second command for changing operation of the remote unit during a second period of time.

12. A distributed antenna system, comprising:
a master unit adapted for communicating digitized signals with remote units operable for providing wireless network coverage in an area, the master unit including a plurality of base transceiver station cards adapted for:
receiving call information in network protocol data from a network,
decoding the network protocol data, and
generating digital signals comprising complex digital samples from the decoded network protocol data for distribution to the remote units, the digital signals including the call information; and
a self-optimized network controller adapted for:
preventing transmission of signals in a downlink band by a remote unit of the distributed antenna system;
sending a command to tune a receiver in the remote unit to receive signals in the downlink band; and
sending a command to the remote unit regarding transmission of signals in the downlink band based on a comparison of processed signals received in the downlink band to an interference threshold.

13. The distributed antenna system of claim 12, wherein the network protocol data is internet protocol data,
wherein each base transceiver station card includes a base transceiver chipset adapted for decoding the internet protocol data and generating the digital signals by:
converting the call information to a wireless communication protocol,
digitizing the call information converted to the wireless communication protocol, and
modulating the digitized call information to generate the digital signals.

14. The distributed antenna system of claim 13, wherein each base transceiver station card includes a frequency translation device adapted for frequency shifting the modulated digitized data.

15. The distributed antenna system of claim 13, wherein the master unit includes a multiplexer adapted for multiplexing the modulated digitized data as the digital signals into a serialized digital data stream for digital transport by a backplane to the remote units.

16. The distributed antenna system of claim 13, further comprising the remote units, each remote unit being adapted for:
converting the digital signals to analog RF signals and causing the analog RF signals to be radiated at an antenna element;
converting uplink analog RF signals received from a wireless device into uplink digital signals; and
multiplexing the uplink digital signals for transport to the master unit.

17. The distributed antenna system of claim 16, wherein the base transceiver chipset is adapted for demodulating the uplink digital signals, converting the demodulated uplink digital signals to uplink analog RF signals, and encoding the analog RF signals into uplink network protocol data.

18. The distributed antenna system of claim 16, wherein each base transceiver station card includes a frequency translation device adapted for frequency shifting the uplink digital signals de-multiplexed by the master unit.

19. The distributed antenna system of claim 13, wherein each base transceiver station card includes:
a first resample device adapted for resampling the modulated digitized data;
a second resample device adapted for resampling uplink digital signals from at least one of the remote units;
a first digital gain device adapted for applying a downlink gain to the modulated digitized data; and
a second digital gain device adapted for applying an uplink gain to uplink digital signals.

20. The distributed antenna system of claim 12, wherein the master unit further includes a summer adapted for summing modulated digitized data from the plurality of base transceiver station cards and providing the summed digitized data to a multiplexer configured for multiplexing the summed digitized data as the digital signals for digital transport to the remote units.

21. The distributed antenna system of claim 12, further comprising:
a self-optimized network analyzer in a unit of the distributed antenna system; and
the self-optimized network controller in the master unit, the self-optimized network controller being adapted for outputting commands for changing operation of a component in the distributed antenna system in response to analysis results from the self-optimized network analyzer.

22. The distributed antenna system of claim 21, wherein the self-optimized network analyzer is in a remote unit of the distributed antenna system.

23. The distributed antenna system of claim 21, wherein the self-optimized network analyzer is in the master unit.

24. The distributed antenna system of claim 12, wherein the command sent to the remote unit regarding transmission of signals in the downlink band includes a command to increase power of the signals transmitting in the downlink band.

25. The distributed antenna system of claim 12, wherein the command sent to the remote unit regarding transmission of signals in the downlink band includes a command to transmit the signals in a different downlink band.

26. The distributed antenna system of claim 21, wherein the self-optimized network controller is adapted for selecting channels for use in the distributed antenna system based on database information and signals from a macro-cell environment processed by the self-optimized network analyzer.

27. A distributed antenna system, comprising:
   a master unit adapted for communicating digitized signals with remote units operable for providing wireless network coverage in an area, the master unit including a plurality of base transceiver station cards adapted for receiving call information in network protocol data from a network and for generating digital signals including the call information from the network protocol data for distribution to the remote units;
   a self-optimized network analyzer in a unit of the distributed antenna system; and
   a self-optimized network controller in the master unit, the self-optimized network controller being adapted for:
      retrieving data from a database describing a macro-cell environment,
      selecting channels for use in the distributed antenna system based on the data describing the macro-cell environment and analysis of signals from the macro-cell environment processed by the self-optimized network analyzer,
      outputting commands for changing operation of a component in the distributed antenna system to use the selected channels in response to the analysis results from the self-optimized network analyzer,
      preventing transmission of signals in a downlink band by a remote unit of the distributed antenna system;
      sending a command to tune a receiver in the remote unit to receive signals in the downlink band; and
      sending a command to the remote unit regarding transmission of signals in the downlink band in response to an indication from the self-optimized network analyzer about a comparison of processed signals received in the downlink band to an interference threshold.

28. The distributed antenna system of claim 27, wherein the self-optimized network analyzer is in a remote unit of the distributed antenna system.

29. The distributed antenna system of claim 27, wherein the self-optimized network analyzer is in the master unit.

30. The distributed antenna system of claim 27, wherein the network protocol data is internet protocol data,
   wherein each base transceiver station card includes:
      a base transceiver chipset adapted for decoding the internet protocol data, converting the call information to a wireless communication protocol, digitizing the call information converted to the wireless communication protocol, and modulating the digitized call information; and
      a frequency translation device adapted for frequency shifting the modulated digitized data,
   wherein the master unit includes a multiplexer adapted for multiplexing the modulated digitized data as the digital signals into a serialized digital data stream for digital transport by a backplane to the remote units.

31. The distributed antenna system of claim 30, wherein each remote unit is adapted for:
   converting the digital signals to analog RF signals and causing the analog RF signals to be radiated at an antenna element;
   converting uplink analog RF signals received from a wireless device into uplink digital signals; and
   multiplexing the uplink digital signals for transport to the master unit.

32. The distributed antenna system of claim 31, wherein each base transceiver station card includes:
   a second frequency translation device adapted for frequency shifting the uplink digital signals de-multiplexed by the master unit,
   wherein the base transceiver chipset is adapted for demodulating the uplink digital signals, converting the demodulated uplink digital signals to uplink analog RF signals, and encoding the analog RF signals into uplink network protocol data.

33. The distributed antenna system of claim 32, wherein each base transceiver station card includes:
   a first resample device adapted for resampling the modulated digitized data;
   a second resample device adapted for resampling the uplink digital signals;
   a first digital gain device adapted for applying a downlink gain to the modulated digitized data; and
   a second digital gain device adapted for applying an uplink gain to the uplink digital signals.

34. The distributed antenna system of claim 33, wherein the master unit includes:
   a summer adapted for summing modulated digitized data from the plurality of base transceiver station cards and providing the summed digitized data to the multiplexer configured for multiplexing the summed digitized data as the digital signals for digital transport to the remote units.

* * * * *